July 23, 1940.  A. RONNING  2,209,094
VEHICLE WHEEL SUSPENSION
Filed Jan. 11, 1939  3 Sheets-Sheet 1
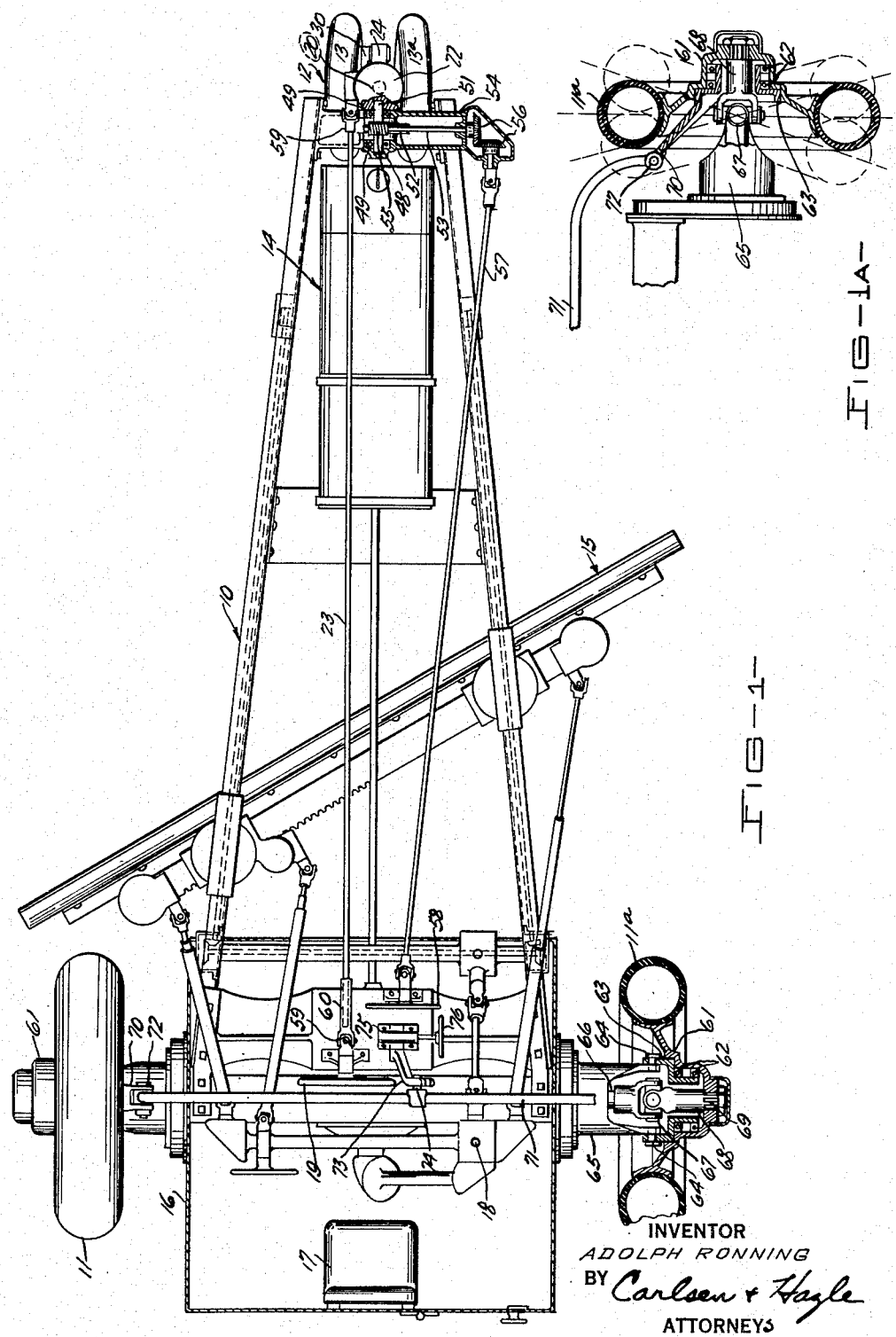

July 23, 1940.  A. RONNING  2,209,094
VEHICLE WHEEL SUSPENSION
Filed Jan. 11, 1939  3 Sheets-Sheet 2
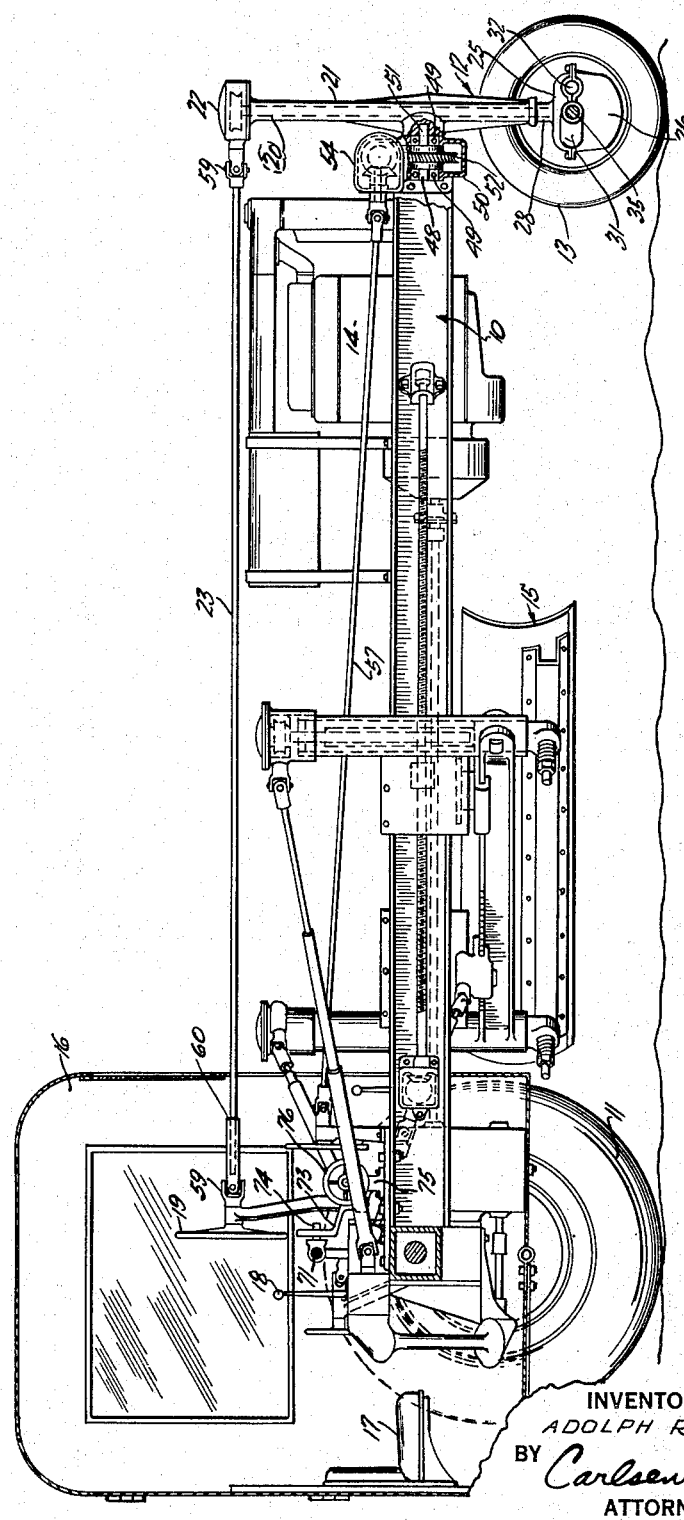
FIG-2-
INVENTOR
ADOLPH RONNING
BY Carlsen & Hagle
ATTORNEYS July 23, 1940.　　　A. RONNING　　　2,209,094
VEHICLE WHEEL SUSPENSION
Filed Jan. 11, 1939　　　3 Sheets-Sheet 3
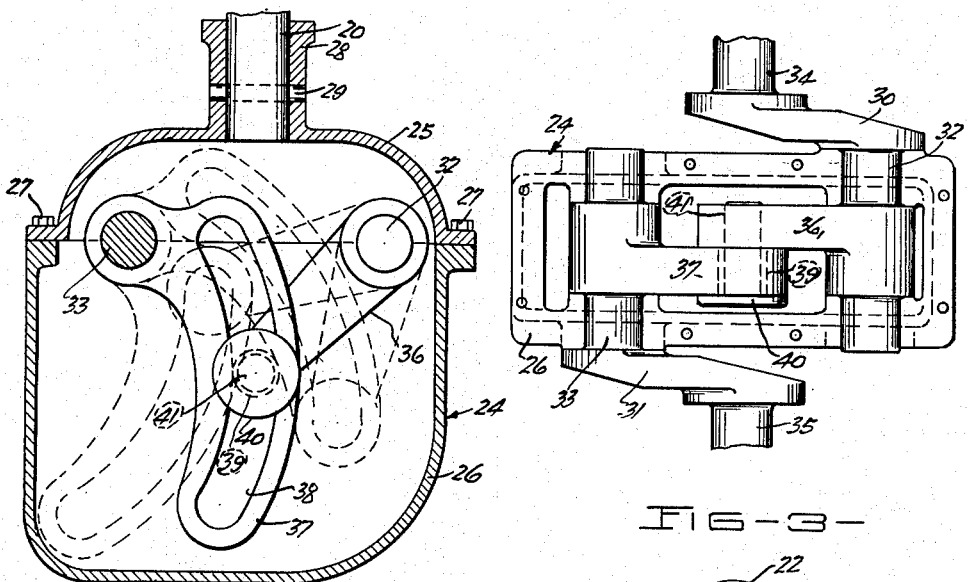
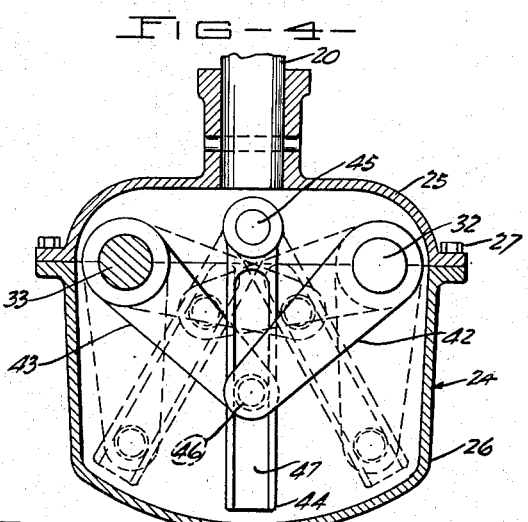
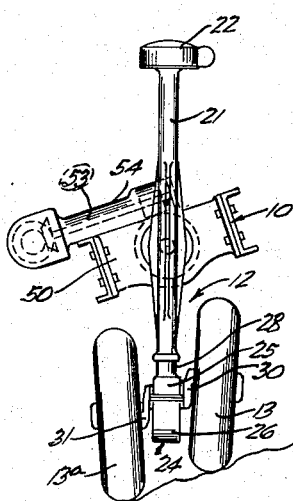
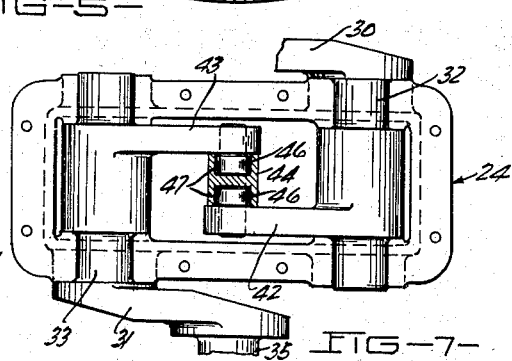
INVENTOR
ADOLPH RONNING
BY Carlsen & Hagle
ATTORNEYS Patented July 23, 1940

2,209,094

UNITED STATES PATENT OFFICE 2,209,094

VEHICLE WHEEL SUSPENSION

Adolph Ronning, Minneapolis, Minn.

Application January 11, 1939, Serial No. 250,344

17 Claims. (Cl. 280—87)

This invention relates to improvements in wheel suspension and mounting means for implements or vehicles.

The primary object of the invention is to provide a wheel mounting assembly for implements or vehicles wherein the wheels have freedom for lateral tilting or leaning movements with respect to the frame or supported mass of the machine, to thus allow the frame to tilt as necessary for proper working and travel upon side hills or sloping terrain. A further object is to provide means for tilting or leaning the steering wheels as well as the power driven wheels of a tractor-implement such as a tractor-grader so as to better counteract or offset the side draft occasioned by the ground resistance imparted to the angularly disposed grader blade or other ground working tool supported by the machine. Another object is to provide, in suspension means of this kind, a differential mounting for certain of the wheels and which has an action such that the wheels are relatively and differentially movable in vertical planes to maintain even load support at all times. Another object is to provide means for remotely controlling the lateral tilting or leaning of the wheels according to the requirements therefor and entirely independently of the differential vertical movements of the differentially adjustable wheels.

These and other more detailed and specific objects will be disclosed in the course of the following specification, reference being had to the accompanying drawings, in which—

Fig. 1 is a plan view showing for example a road grader equipped with my improved wheel suspension, a frontal portion and one traction wheel being shown in horizontal diametrical cross section.

Fig. 1A is a vertical diametrical cross section through one traction wheel, adjacent parts being shown in fragmental elevation, and positions assumed by the wheel in its leaning movement being shown in dotted lines.

Fig. 2 is a side elevation of the machine as shown in Fig. 1, front and rear portions being shown in longitudinal vertical section.

Fig. 3 is an enlarged plan view of the differential mounting assembly for the front wheels, the casing cover being removed to disclose interior construction and the wheel mounting spindles being partially broken away.

Fig. 4 is a vertical and longitudinal cross section through the front wheel mounting assembly and a connected lower portion of the steering post.

Fig. 5 is a similar view but showing a modified arrangement of the connecting linkage for the differential action of the front wheels.

Fig. 6 is a front elevation of the front wheel assembly and implement frame, showing the action of the leaning or lateral tilting mechanism and also illustrating the relative positions of the wheels in their differential vertical movements.

Fig. 7 is a plan view, similar to Fig. 3, of the assembly shown in Fig. 5, but with the connecting member or bar shown in horizontal cross section.

My invention is herein disclosed as applied to a tractor road grader, but this is for purpose of exemplification only, and it is to be understood that my invention may be applied as well to other wheel borne, and preferably self propelled, implements or vehicles, as may be found desirable.

The specific type of road grader as herein shown is identical in major respects to that covered by my prior Patent No. 2,065,397 issued December 22nd, 1936, and the various blade controls shown are more specifically illustrated, described, and claimed in my Patent No. 1,883,424, of October 19th, 1932, and No. 2,005,243, of June 18th, 1935. The differential wheel mounting for the forecarriage, while herein disclosed in detail and claimed in the specific forms illustrated, is also similar in general make-up to the mountings disclosed in my copending applications Serial No. 219,369, filed July 15th, 1938; Serial No. 244,019, filed December 5th, 1938; Serial No. 247,608, filed December 24th, 1938; Serial No. 242,725 and Serial No. 242,726, both filed November 28th, 1938; and Serial No. 250,345, filed January 11th, 1939. Reference to these prior patents and applications is invited for comparative purposes and for details of construction not herein claimed.

Referring now with more particularity and by reference numerals to the drawings, 10 designates the main frame body or supported mass of the implement, and which is supported rearwardly by large traction wheels 11 and 11a and forwardly by a steerable fore carriage or truck 12 including close spaced front wheels 13 and 13a. The frontal part of the frame 10 carries the power unit 14 connected to the traction wheels 11—11a for driving the same and at an intermediate portion beneath the frame the working tool or scraper blade 15 is mounted. This blade is arranged for adjustment in fore and aft, transverse and vertical directions, as well as for variation in face angle and transverse inclination, and the controls for thus adjusting the blade are all located at the rear portion of the machine within the cab 16 and convenient to the hands of an operator seated at 17 in the cab. In fact a lever 18 serves to control vertical position and face and cutting angle of the blade so that these necessary and frequently used adjustments may be made solely by proper manipulation of the single lever. In addition to the foregoing controls and adjustments the machine is steered by the wheel 19 in usual manner. For a more detailed disclosure of the working parts and operation of the blade controls, as well as the general construction of the grader, reference may be had to my prior patents hereinbefore enumerated.

My invention concerns itself particularly with the mounting and suspension means for the wheels 11 and 11a and 13 and 13a, and the arrangement of the latter will now be described in detail. The fore carriage or truck 12 includes a vertically axised steering post 20 mounted for rotation in a housing 21 at the frontal end of the frame 10, and carrying the wheels 13 and 13a in close spaced relation at its lower portion. At the upper end the steering post 20 is connected by a conventional worm and gear mechanism in housing 22 to a steering shaft 23 running rearwardly to the steering wheel 19 so that manipulation of the wheel will cause oscillating adjustment of the steering post to angularly steer the wheels.

These wheels 13—13a are ordinarily mounted upon a rigid cross axle at the lower end of the housing 21 but, in accordance with my invention, they are movably supported for differential vertical movements, as will now be described. This assembly (Figs. 3 and 4) includes a casing or housing 24 having an upper section 25 and lower section 26 removably fitted together and secured by screws 27 and secured to the lower end of the steering post 20 by a neck 28 and cross pin 29 to turn with the post about its axis. Crank arms 30—31 are provided and at opposite ends have stub shafts 32—33 by which they are journaled transversely into the casing 24 at the front and rear ends thereof and in bearings formed at the median line or junction between the upper and lower sections 25 and 26 thereof. At their free ends the crank arms 30—31 carry rigidly mounted and laterally extended spindles 34—35 to rotatively receive the wheels 13—13a, and these spindles slope outwardly somewhat in order to provide proper camber for the wheels.

Within the casing 24 an arm 36 is rigidly secured to one stub shaft 32 and radially extends therefrom. Upon the other stub shaft 33 a slotted cam arm or yoke 37 is rigidly affixed, and the arcuate slot 38 in this member is engaged by a roller 39 on the free end of the arm 36 in such manner that oscillating movement of either stub shaft in either direction will be transmitted differentially to the other, causing a corresponding but opposite movement thereof. The roller 39 plays freely in the cam slot 38 for this purpose, and is retained therein by a diametrically enlarged head flange 40 of its mounting pin 41.

The foregoing arrangement is such that the weight of the machine when imposed upon the fore carriage will press both wheels 13—13a equally to the ground, but should either wheel be urged upwardly, as by meeting a rise in the ground, then the other wheel, due to the differential linkage connecting the crank arms supporting the wheels, will be moved downwardly by a corresponding amount. The weight will at all times, however, be equally distributed between the wheels, as will be readily evident. The cranks 30 and 31 being oppositely turned, of course dispose the wheels 13 and 13a in proper transverse alignment, as shown.

In lieu of the foregoing arrangement I may, as shown in Figs. 5 and 7, employ for the differential connecting means a pair of straight arms 42 and 43 secured to the stub shafts 32 and 33 within the housing 24 and also a grooved connecting member or lever 44. This lever 44 is pivotally suspended from a bearing point 45 in the upper section 25 of the housing, and depends medially between the arms 42 and 43. The free ends of these arms are offset oppositely to pass on opposite sides of the lever 44 and each carries a roller 46 which plays in the longitudinal grooves 47 in opposite sides of the lever. The arrangement is such that as either arm 42 and 43 is swung upwardly by upward pressure on its connected wheel 13 or 13a, the camming action of the roller 46 in the groove 47 will urge the lever 44 toward the other arm and cause it to swing downwardly to bring about the desired differential movement of the wheels. The positions assumed by the parts in this operation are clearly shown by the dotted lines in Fig. 5.

The steering post housing 21 is oscillatably mounted about a horizontal and fore and aft extended axis at the front of the frame 10 by means of a short pin or stub shaft 48 journaled in bearings 49 in a transverse channel member 50 secured to said frame. The frontal end of this pin is secured by a driving fit or by any other suitable means, in the housing 21 at 51, and a worm gear 52 is secured to the pin within the member 50. A transversely extended drive shaft 53 is journaled in a housing 54 above said member 50 and carries a worm 55 at its inner end meshing with said worm gear 52. Beveled gears 56 at the outer end of the shaft 53 and forward end of an operating shaft 57 connect the two, and the latter shaft extends rearwardly within the cab 16 where it is provided with a handwheel 58, the manipulation of which will rotate the shaft 53, oscillate the pin 48, and adjust the housing 21 to various angles in a vertical transverse plane relative to the frame 10. As shown in Fig. 6 therefore, the frame 10 of the implement may be inclined to either side to maintain the tool 15 in parallelism with a sloping side hill, while the wheels 13 and 13a maintain their normal vertical positions and resist what otherwise would be a tendency for side drift or slipping movement of the machine downwardly on the hill. In this operation the differential mounting and support of the wheels 13 and 13a allows the wheels to adjust themselves to evenly support and bear the weight of the implement and in fact this differential mounting is the factor making possible the leaning or inclination of the frame as described.

The shaft 23 is provided with universal joints designated generally at 59, and a slip bearing 60, to permit the necessary play of the housing 21 without loss of control of the steering action as will be readily evident.

The rear traction wheels 11 and 11a are also arranged to leave or oscillate about horizontal and fore and aft axes by a construction now to be described. The wheel hubs 61 are journaled by bearings 62 upon sleeve or supporting members 63 which in turn are pivotally mounted by pins 64 upon the outer ends of rigid tubular housings 65 extended from the sides of the implement frame coaxially with the driven axle 66 of the wheels. Connection between this axle 66 and the hubs 61 is made at each end by universal joints 67 and short stub axles 68 keyed, splined, or otherwise fitted into the hubs as indicated at 69. Arms 70 are extended upwardly and inwardly from the members 63 and are joined by a cross rod 71 pivotally connected at its ends 72 to said arms. A fork 73 engages a pin 74 fastened to a medial portion of the cross rods 71 and this fork is pivotally mounted in a housing 75 which contains a conventional worm and gear drive connected to a hand wheel 76 by which the fork may be oscillated to move the cross rod endwise and transversely of the implement. Such movement of the cross rod, through its connection to the arms 70, acts to adjust the members 63 upon their pivot pins 64 to lean the wheels 11 and 11a in corresponding transverse directions, as will be evident. The hand wheels 58 and 76 thus controlling the angular adjustment of the front and rear wheels are located conveniently close to each other so that the operator may readily adjust the inclination in either direction according to the contour of the ground.

The possible adjustments of the implement are obviously manifold and the exigencies of any conceivable situation may be met thereby. Of course the use of the leaning wheel feature is not restricted to side hill work, and will be found to be of great advantage in resisting a normal tendency of the machine to drift sidewise when moving a heavy load of dirt over a flat area of ground. The differential action of the wheels of the fore truck is also of extreme advantage in that they may in effect independently "walk over" minor obstructions and humps in the unworked ground ahead of the tool without materially elevating the fore end of the machine or causing the tool to be appreciably raised from normal working level. Further details of the utility and advantages of my invention will be apparent to those skilled in the art.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A steering truck for a vehicle comprising a member secured to the vehicle frame for angular adjustments in a transverse plane and about a fixed longitudinal axis, a pair of transversely spaced wheels supporting the member and being mounted for arcuate steering movements about a common axis, said wheels also being movable in up and down directions, and differential means operative to produce movement of the wheels in respectively opposite up and down directions.

2. In a vehicle, a pair of wheel supported crank members, arms extending from the members, one of said arms having a cam surface and the other arm movable operating contact with said cam surface.

3. A steering truck for a vehicle frame comprising a mounting member, means for securing the member to the frame whereby the member may be transversely adjusted with respect to the frame in an arc about a longitudinally disposed axis, means for adjusting the member about a substantially upright axis, ground wheels connected to the mounting member so as to be steerable therewith about said axis but having freedom for relative up and down movements with respect to the mounting member, and differential means for translating the up movement of one wheel into a down movement of the other wheel.

4. A steering truck for a vehicle frame comprising a mounting member, means for securing the member to the frame whereby the member may be transversely adjusted with respect to the frame, about a fore and aft extending axis, ground wheels disposed at opposite sides of the mounting member with freedom for relative up and down movements, differential mechanism connecting the wheels to the member and operative to translate an up movement of one wheel to a relative down movement of the other, and means for steering the member, wheels, and mechanism with respect to the frame about a common upright axis.

5. A steering unit for a vehicle comprising a mounting member connected to the vehicle for transverse adjustment with respect thereto, a pair of generally fore and aft extending cranks secured to and supporting the member, wheels secured to and for supporting the respective cranks, differential mechanism connecting the cranks, and means for steering the wheels.

6. A steering unit for a vehicle comprising a mounting member connected to the vehicle for transverse adjustment with respect thereto, a pair of generally fore and aft extending cranks secured to and supporting the member, wheels secured to and for supporting the respective cranks, differential mechanism connecting the cranks, and means for oscillating the mounting member about a generally upright axis to steer the wheels.

7. A steering unit for a vehicle comprising a member pivotally connected to the vehicle for oscillating movement about a fore and aft extending axis, a generally upright steering post journaled in the member, means for adjusting the member about its axis to control the angle of the steering post in a transverse vertical plane with respect to the vehicle, a pair of ground wheels supporting the member and connected with the steering post for steering action thereby, and differential mechanism connecting the wheels to translate the up and down movements of one into relatively opposite movements of the other.

8. A vehicle steering unit comprising a member supporting one end of the vehicle, a pair of ground wheels supporting the member, differential mechanism including fore and aft extending crank arms connecting the wheels to cause them to move simultaneously in opposite up and down directions when traveling over irregular ground surfaces, means for steering the wheels, and means for shifting the member transversely with respect to the vehicle so as to shift the wheels transversely with respect to the path of travel of the vehicle.

9. A vehicle steering unit comprising a housing supporting one end of the vehicle and steerable about a generally upright axis, means for adjusting the housing transversely of the vehicle and independently of steering action, a pair of crank arms extending from the housing, differential mechanism connecting the arms within the housing, and ground wheels attached to and supporting the respective arms.

10. In a vehicle, a pair of generally fore and aft extending crank members mounted for oscillation from relatively fixed bearings, wheels supporting the respective members, interconnected arms extending from the members and operating to differentially actuate the arms to move the wheels in opposite up and down directions, one of said arms having an elongated guide and the other arm having movable but controlled contact with respect to the guide.

11. In a vehicle, a pair of generally fore and aft extending crank members mounted for oscillation from relatively fixed bearings, wheels supporting the respective members, arms attached to the respective crank members and extending into overlapped positions with respect to each other, and means connecting the arms in a manner to translate predetermined movements of one into predetermined but different movements of the other.

12. In a vehicle, a pair of generally fore and aft extending crank members mounted for oscillation from relatively fixed bearings, wheels supporting the respective members, arms attached to the respective crank members and extending into overlapped position with respect to each other, one of said arms having an arcuate guide and the other arm having means movably engageable with the guide.

13. In a vehicle, longitudinally spaced transverse bearings, crank members journaled in the bearings, wheels supporting the crank members, a cam acting arm extending from one of the members, and a guide arm extending from the other member for engagement with the cam acting arm.

13. In a vehicle, longitudinally spaced transverse bearings, crank members journaled in the bearings, wheels supporting the crank members, arms extending from the crank members in directions toward each other so as to normally overlap, and an oscillatable guide member connecting the arms in a manner to convert oscillating movements of one into oscillating movements of the other.

15. In a vehicle, longitudinally spaced transverse bearings, crank members journaled in the bearings, wheels supporting the crank members, arms extending from the crank members at acute angles with respect to a plane passing through the bearings, a guide arm fulcrumed on an axis disposed substantially midway between the bearings, and guide connections between the crank member arms and said guide arm.

16. A steering unit for a vehicle comprising a normally vertical sleeve, means for pivotally mounting the sleeve to the vehicle for oscillating movement about a fore and aft extending axis but restraining movement of the sleeve about its longitudinal axis, a generally upright steering post journaled in the sleeve, means for adjusting the sleeve about its axis to control the angle of the steering post in a transverse vertical plane with respect to the vehicle, and at least one ground wheel supporting the sleeve, said ground wheel being connected with the steering post so as to be steerable thereby.

17. A steering unit for a vehicle comprising a normally vertical sleeve, means for pivotally mounting the sleeve to the vehicle for oscillating movement about a fore and aft extending axis but restraining movement of the sleeve about its longitudinal axis, a generally upright steering post journaled in the sleeve, means for adjusting the sleeve about its axis to control the angle of the steering post in a transverse vertical plane with respect to the vehicle, and at least one ground wheel supporting the sleeve, said ground wheel being connected with the steering post so as to be steerable thereby, said sleeve mounting means being connected to the sleeve at a point intermediate the upper and lower ends thereof.

ADOLPH RONNING.